US010421826B2

United States Patent
Wang et al.

(10) Patent No.: US 10,421,826 B2
(45) Date of Patent: Sep. 24, 2019

(54) METHODS FOR IMPROVING THE BASE COLOR OF PLASTIC BY REDUCING BIOLOGICAL GROWTH IN THE LATEX SYSTEM

(71) Applicant: SABIC Global Technologies B.V., Bergen op Zoom (NL)

(72) Inventors: Shi Wang, Ottawa, IL (US); Jianhua Xu, Newburgh, IN (US); Vern Lowry, Ottawa, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 120 days.

(21) Appl. No.: 15/553,841

(22) PCT Filed: Feb. 15, 2016

(86) PCT No.: PCT/EP2016/053180
§ 371 (c)(1),
(2) Date: Aug. 25, 2017

(87) PCT Pub. No.: WO2016/134998
PCT Pub. Date: Sep. 1, 2016

(65) Prior Publication Data
US 2018/0037679 A1    Feb. 8, 2018

Related U.S. Application Data

(60) Provisional application No. 62/126,233, filed on Feb. 27, 2015.

(51) Int. Cl.
| C08F 6/22 | (2006.01) |
| C08F 6/00 | (2006.01) |
| C08K 5/00 | (2006.01) |
| C08F 279/04 | (2006.01) |
| C08K 3/16 | (2006.01) |
| C08K 5/3492 | (2006.01) |

(52) U.S. Cl.
CPC ............ *C08F 6/22* (2013.01); *C08F 6/008* (2013.01); *C08F 279/04* (2013.01); *C08K 3/16* (2013.01); *C08K 5/0058* (2013.01); *C08K 5/3492* (2013.01)

(58) Field of Classification Search
USPC ......................................................... 524/101
See application file for complete search history.

(56) References Cited

U.S. PATENT DOCUMENTS

| 2,393,348 A * | 1/1946 | Waterman ................. C08C 1/14 |
| | | 260/DIG. 22 |
| 3,892,699 A | 7/1975 | Weisse |
| 5,736,591 A | 4/1998 | Dunn |
| 7,005,145 B2 | 2/2006 | Angel et al. |
| 2010/0016441 A1 | 1/2010 | Raymond et al. |
| 2012/0183494 A1 | 7/2012 | Worley et al. |

FOREIGN PATENT DOCUMENTS

EP    1398043 A2    3/2004

OTHER PUBLICATIONS

International Search Report for International Application No. PCT/EP2016/053180; dated Jun. 6, 2016; 5 pages.
Khaneja, R., et al.; "Carotenoids found in Bacillus"; Journal of Applied Microbiology, 2010, vol. 108, pp. 1889-1902.
Mitchell C., et al.; "Red Pigment in Bacillus megaterium Spores"; Applied and Environmental Microbiology, 1986, vol. 52(1), pp. 64-67.
Ogunnariwo, J., et al.; "Brown- and Red-Pigmented Pseudomonas Aeruginosa: Differentiation Between Melanin and Pyorubrin"; J Med Microbiol, 1975, vol. 8, pp. 199-203.
Written Opinion of the International Search Report for International Application No. PCT/EP2016/053180; dated Jun. 6, 2016; 7 pages.

* cited by examiner

*Primary Examiner* — Terressa Boykin
(74) *Attorney, Agent, or Firm* — Cantor Colburn LLP

(57) ABSTRACT

A method for providing a resin having minimal discoloration comprises combining, in a reactor or a reactor vessel, monomers, an emulsifier or surfactant, and an initiator in solution to form a polymeric latex; directing the polymeric latex into a storage system comprising a storage vessel; maintaining the latex in the storage vessel for an aging time and ensuring that the polymeric latex exhibits less than 1000 CFU/ml of biological growth according to ASTM D 5465-93 (2012) upon completion of the aging time; and coagulating the polymeric latex, wherein the polymeric latex is exposed to a mixture of water and a coagulant and filtered to provide a resin.

18 Claims, No Drawings

METHODS FOR IMPROVING THE BASE COLOR OF PLASTIC BY REDUCING BIOLOGICAL GROWTH IN THE LATEX SYSTEM

CROSS REFERENCE TO RELATED APPLICATIONS

This application is a 371 of International Application No. PCT/EP2016/053180, filed Feb. 15, 2016, which claims priority to U.S. Application No. 62/126,233, filed Feb. 27, 2015, both of which are incorporated herein by reference in their entirety.

The present disclosure relates to methods to achieve better resin base color by reducing biological growth in latex storage systems of emulsion polymerization processes.

Copolymer resins, including, for example acrylonitrile-butadiene styrene, styrene-butadiene styrene, acrylonitrile-ethylene-butadiene-styrene, methyl methacrylate-butadiene styrene, or styrene acrylonitrile, are readily produced via polymerization processes, such as emulsion, bulk, or suspension polymerization. Latex, defined as an aqueous colloidal distribution of polymer particles, is a ubiquitous intermediate of an emulsion or suspension polymerization. Generally, monomeric compounds are reacted with a free radical initiator in solution to induce the polymerization process. The latex generated can then be stored for an extended period of time before proceeding with further processing to ultimately provide the copolymer resin product.

The aqueous environment of stored latex can be susceptible to biological growth prior to further processing for end-use products. This biological growth can negatively affect the viscosity, pH, stability, odor, and color of the latex. Such unfavorable effects can remain with the latex samples indefinitely. For example, when the latex is isolated for continued processing, the microbes can be isolated therewith and can cause distortions in both physical properties and appearance. Indeed, for latex generated as an intermediate in the preparation of copolymer resins, the color impurities from biological growth can influence the color of the ultimate resin product. Thus, there remains a need for an emulsion polymerization process where the storage of the latex intermediate is relieved of microbial growth and the accompanying distortions.

The present disclosure relates to methods of reducing the accumulation of biological growth during storage of the latex phase generated from emulsion polymerization of monomers. The methods disclosed herein can also be suitable for reducing the accumulation of biological growth during storage of latex generated during other types of polymerization, such as, for example, suspension polymerization. The polymerization and treatment methods described herein can inhibit the growth of microbes in latex stored for an extended period of time at elevated temperatures.

In various aspects, the disclosed methods provide a means of preventing colored microbes from staining latex and its subsequent end-use products. In yet further aspects, the present disclosure relates to methods of reducing biological growth in the latex phase of preparing copolymer resins.

In some aspects, the present disclosure relates to a treatment for reducing biological growth in aqueous latex systems. In further aspects, the treatment can improve the overall appearance of the latex and an ultimate resin product by reducing biological growth.

The process of emulsion polymerization to yield polymeric resins can feature an intermediary latex phase. Polymerizable monomers can be combined in solution in the presence of a free radical initiator, and an emulsifier or surfactant to provide a latex phase. The latex phase can be further processed to provide a graft polymerized latex and further processed to provide copolymer resins among other end products.

In various aspects, the polymerization process providing latex can comprise a first stage and a second stage. In a first stage, a rubber substrate can be produced. As an example, latex can serve as a rubber substrate for use in the second stage. In certain cases, such latex particles can be considered too small. Accordingly, the rubber substrate (e.g., latex) can be homogenized, direct growth, or chemically or colloidally agglomerated. The second stage can comprise grafting a copolymer onto to the rubber (latex) particles. For example, grafted copolymer latex can be subjected to a series of isolation processes such as coagulation, dewatering, and drying. In certain aspects, latex can be stored for an extended period of time before proceeding with isolation processing. After storage and subsequent isolation, a copolymer resin product can be produced. For example, the isolated latex can be compounded and pelletized into small resin pellets.

As noted herein, the generated rubber (e.g., latex) can be retained in a storage system before subsequent processing. Vessels of the storage system can include the latex, water, surfactants, and other additives. Unfortunately, microbes can thrive in these aqueous polymeric environments. These microbes can include *Pseudomonas stutzeri, Micrococcus flavus, Candida albicans, Aspergillus niger*, among others. This biological accumulation can impair many of the physical and aesthetic properties of the latex composition such as pH, stability, viscosity, odor, and coloring. Indeed, certain microbes have been found to display vivid colors and can stain the latex during storage. The color can persist after the latex is removed from storage and further processed, ultimately becoming apparent as distortions in the final product. Often, the final resin has a natural color of ivory to white. However, colored microbes bred during storage of the latex can become visibly apparent in the resulting base resin. As a consequence, the base resin can have an inconsistent coloring throughout causing the resin to be darker or yellower. The increased darkness or yellowness then requires additional pigments to normalize the color for processing into pellets for sale or for end user products. In these ways, among others, the microbial growth can be both a lasting and costly byproduct of aqueous latex storage.

In one aspect, the methods of the present disclosure can minimize or eliminate biological growth during storage of the latex phase of polymerization. For example, the methods of the present disclosure can limit biological growth during storage of the latex phase after an emulsion polymerization process is completed. The present disclosure provides multiple methods for preventing biological growth. For example, the effluent used to flush the latex storage system can comprise a chlorine solution. As a further example, the temperature of the storage vessel can be modified. In yet further examples, the stored latex can be treated with a biocide or ultraviolet light.

In further aspects, the methods can prevent microbe-related color distortions in a copolymer resin product derived from a stored latex.

The present disclosure can be understood more readily by reference to the following detailed description of the invention and the Examples included therein.

Polymerization

Emulsion polymerization of unsaturated monomers can give rise to a family of addition polymers. The polymerized resins made by an emulsion polymerization process can comprise a discontinuous rubber phase (or latex phase) dispersed in a continuous rigid thermoplastic phase, wherein at least a portion of the rigid thermoplastic phase is chemically grafted to the latex phase. The latex phase can be made by aqueous emulsion polymerization in the presence of a free radical initiator, a surfactant and, optionally, a chain transfer agent and homogenized to form particles of rubber phase material. Additional unsaturated monomers can then be graft polymerized onto the rubber substrate to provide the final copolymer resin. In an example, acrylonitrile butadiene styrene (ABS) can be prepared by grafting styrene and acrylonitrile monomers onto a homogenized polybutadiene latex via emulsion polymerization.

In an aspect, an exemplary emulsion polymerization process for the preparation of a latex such as an ABS latex can comprise a first and a second stage. In the first stage, a rubber latex can be prepared and in the second stage, monomers can be grafted onto the rubber substrate via emulsion polymerization. For example, a first stage can comprise the generation of a polybutadiene latex (the rubber substrate) upon which acrylonitrile and styrene monomers are grafted in the second stage. The first and second stage can proceed through a characteristic emulsion polymerization process. As an example, a first stage can involve combining water, unsaturated monomers, an emulsifier, a chain transfer agent, various additives, and an initiator to form an initial liquid batch. The initial liquid batch can be combined in a vessel and heated to from 54.4° C. (130° F.) to 79.4° C. (175° F.) to provide a rubber latex, suitable for use as a rubber substrate in a second stage.

In various aspects, the initial liquid batch can be introduced into a reactor vessel. For example, the polymerization can proceed in a closed reactor, or in a series of vessels or reactors. The vessel can vary in range, from, for example, 1 liter to as large as 75,700 liter (20,000 gallons). It will be understood that other vessels and/or reactors of different volumes can also be used for the polymerization process and can be easily and/or conveniently scaled for industrial manufacture or production of a desired resin product. For example, the vessel can have a capacity of at least 3.5 kg liquid volume occupied. The volume of the vessel can refer to the internal volume of the vessel available for occupation by the liquid and vapor containing the applicable reagents. In an example, the initial liquid batch can be introduced into the reaction vessel in an amount sufficient to occupy 40% to 80% of the volume of the vessel, more preferably from 50% to 70% thereof, and most preferably from 50% to 60% thereof.

In various aspects, a feedstream comprising the reagents making the initial liquid batch can be continuously supplied to the reaction vessel. The reaction pressure can be maintained between 238 to 1134 kPa (20 to 150 psig) depending on the reaction temperature. The rate of reaction can peak during the first two hours of the reaction when the vapor space is greatest in the vessel.

In an aspect, the reaction time of the polymerization process to provide a polybutadiene latex, for example, can be from 5 hours to 20 hours with the reaction temperature ranging from 54.4° C. (130° F.) to 79.4° C. (175° F.) in a closed reactor vessel. In an example, the temperature of the contents of the vessel can be increased by using a heating system, for example a hot steam jacket system. Other heating systems, for instance heating systems or heaters known in the related art, can also be used for changing, and/or maintaining, the temperature of the vessel. The contents of the vessel can be stirred to mix using a stirrer or agitator, for example.

In a further example, an acrylonitrile styrene acrylate latex can be prepared by grafting styrene and acrylonitrile monomers onto a poly butyl acrylate latex via an emulsion polymerization process. In certain aspects, the latex for subsequent storage can be prepared according to a number of polymerization processes and according to a number of variations to the process itself with respect to reagents and reaction conditions. As an example, the latex can be generated according to a batch process or a semi-batch process. As another example, the latex can be generated through a continuous polymerization process. Batch and continuous polymerization can refer to the conditions through which the polymerization proceeds. In a batch process, reagents can be placed in a reactor, the reagents mixed and heated, and the polymerization reaction allowed to proceed typically without interruption. In a semi-batch process, reagents can continue to be introduced to the reaction system through a feed stream during the polymerization process. For a continuous process, the reactant system can be continuously fed to, and removed from at a reaction rate such that the total volume of the system undergoing reaction at any given instant can remain constant.

A number of reagents can be used in the emulsion polymerization process. The relative quantities and/or concentrations of one or more reagents for the polymerization process can be selected and varied, for instance depending on a target speed of reaction and/or a target or intended relative component composition of the intermediate product formed via the polymerization process.

In one aspect, a first stage polymerization of monomers can provide a rubber latex substrate, such as polybutadiene latex, for the preparation of a copolymer resin, such as ABS or ASA. There are a number of suitable monomers available for use in the polymerization system. Suitable monomers can include vinyl aromatic monomers and vinyl cyanide (unsaturated nitrile) monomers. Monovinylidiene aromatic monomers (vinyl aromatic monomers) which can be employed include styrene, alpha-ethyl styrene, halostyrenes (dibromostyrene), mono- or dialkyl, alkoxy or hydroxy substituted groups on the nuclear ring of the monovinylidiene aromatic monomer (vinyl toluene, vinylxylene, butylstyrene, para-hydroxystyrene or methoxystyrene, or mixtures thereof. Suitable vinyl cyanide monomers can include acrylonitrile and substituted vinyl cyanides such as methacrylonitrile, acrylonitrile, ethacrylonitrile, alpha-chloroacrylonitrile, and alpha-bromoacrylonitrile. For the preparation of a polybutadiene, the monomers can comprise butadiene and isoprene as well as various monomers, which can be present to produce copolymers of butadiene with up to 50% by weight of monomers such as styrene, acrylonitrile, methylmethacrylate or C1-C6 alkylacrylate. In other examples, up to 35% by weight of monomers is added. The monomers listed herein can be appropriate for both the preparation of the rubber latex substrate generated in the first stage as well as the graft polymerization of the second stage.

In a further aspect, an exemplary emulsion polymerization process can provide an ASA latex, which can also proceed according to a first and a second stage. In the first stage, the rubber latex can be prepared upon which monomers can be grafted in a second stage via emulsion polymerization. For an ASA latex, a first stage can comprise the generation of a poly butyl acrylate latex (the rubber substrate) upon which acrylonitrile and styrene monomers are grafted in the second stage. The first and second stage can proceed through a characteristic emulsion polymerization process. In one example, a first stage can proceed through a continuous emulsion polymerization process where water, unsaturated monomers, an emulsifier or emulsifier package, a cross-linking agent, various additives, and an initiator are combined in a single vessel to which the reagents are added and removed at a rate such that the volume of reagents ant any given instant is constant. For instance, to prepare the precursory poly butyl acrylate latex for the ASA latex, 95 parts by weight to 100 parts by weight of butyl acrylate, up to 5 parts by weight of a cross-linking agent, a redox initiator (as described herein); and 1 part by weight to 5 parts by weight of a an emulsifier can be fed into a reactor vessel at 48.9° C. (120° F.) to 73.9° C. (165° F.). The resultant mixture can provide a poly butyl acrylate rubber substrate onto which unsaturated monomers can be grafted to provide a grafted rubber latex. As an example, suitable unsaturated monomers can comprise acrylonitrile and styrene to provide a grafted ASA latex.

In some aspects, an appropriate chain transfer agent can be added to the emulsion polymerization systems of the present disclosure to improve the properties of the final resin product. In an example, the chain transfer agent can be added continuously during the feed portion of a semi-batch polymerization process to provide a rubber latex. In other instances, for example, during a batch addition, the chain transfer agent can be added at the beginning of the reaction. The chain transfer agent can function as a molecular weight modifier. Appropriate chain transfer agents can included, for example, organic sulphur compounds, such as C1-C15 alkyl mercaptans, n-, i-, and t-dodecyl mercaptan (t-DDM). The amount of chain-transfer agent (CTA) can vary according to the particular chain-transfer agent, the monomer or mixture of monomers employed, the initiator employed, the polymerization reaction conditions, and so forth. In an example, the chain transfer agent can be added in the range of from 0.1 to 3 weight parts of chain transfer agent per 100 weight parts of the monomer. In further examples, the amount of chain transfer agent used can be from 0.1 to 2 weight parts of chain transfer agent per 100 weight parts of the monomer.

In some aspects, a portion of the chain transfer agent can be added with the initial batch of reagents introduced into the reaction vessel, while the rest can be introduced during a continuous feed during a polymerization process where continuous feed is employed. In one example, from 10% to 50% of the chain transfer agent can be added with the initial batch of reagents introduced into the reaction vessel and the rest can be added via a continuous stream. In other aspects, all of the chain transfer agent can be added via the continuous feed.

In some aspects, for example, in the preparation of a poly butyl acrylate rubber substrate, a cross-linking agent can be used to facilitate the emulsion polymerization process. In one example, the cross-linking agent can comprise a composition having a multiple carbon-carbon double bonds, or multiple allyl groups. As a further example, the composition can cyanurate comprise triallyl cyanurate.

In various aspects, a stabilizer or emulsifier can be added to the emulsion polymerization process in such a manner that the final particle size of the finished latex can be controlled. Emulsifier can refer to a molecule with a hydrophobic end and a hydrophilic end. Emulsifiers appropriate for the polymerization process as described herein can include anionic emulsifiers, such as higher fatty alcohol sulphates, higher alkyl sulphonates, alkylaryl sulphonates, aryl sulphonates, together with the condensation products thereof with formaldehyde, salts of sulphosuccinic acid esters and sulphated ethylene oxide adducts; non-ionic emulsifiers, including the known reaction products of ethylene oxide and fatty alcohols, such as lauryl, myristyl, cetyl, stearyl and oleyl alcohol, with fatty acids, such as lauric, myristic, palmitic, stearic and oleic acid, and the amides thereof, and with alkylphenols, such as isooctyl-, isonoyl-, and dodecylphenol. An emulsifier can typically be used in quantities of 0.1 wt. % to 10 wt. %, more specifically, 0.2 wt. % to 8 wt. % based on the total quantity of monomers used.

In some aspects, a free radical initiator can be used during the emulsion polymerization process. Suitable free radical initiators can include water soluble initiators, such as for example, peroxide compounds, especially inorganic persulfate compounds including ammonium persulfate, potassium persulfate, and sodium persulfate; peroxides such as for example hydrogen peroxide; organic hydroperoxides, such as for example cumene hydroperoxide, t-butyl hydroperoxide, acetyl peroxide, lauroyl peroxide; peracetic acid and perbenzoic aid; redox initiators wherein a water soluble reducing agent such as a ferrous compound with reductants promotes the decomposition of peroxides, persulfates and the like; as well as other free radical producing materials such as 2,2'-azobisisobutyronitrile, 4,4'-azobis(4-cyanovaleric acid), and the like. In one aspect, the initiator can be a high activity redox initiator such as cumene hydroperoxide or other hydroperoxides in combination with other compounds such as reducing agents, heavy metal salts and complexing agents. In some aspects, the initiator can be added to provide an initial reaction rate of at least 10% of the total monomer of the reaction reacted per hour. In other aspects, the reaction rate can convert from 15% to 20% of the total monomer. In an aspect, the free radical initiator can be introduced with the feed of reagents. Introducing the free radical initiator with the feed can maximize the heat generated early in the polymerization process.

In various aspects, additional additives can be used in the emulsion polymerization process. These additives can include inorganic and organic salts. In further aspects, additional additives can include electrolytes, reducing agents, heavy metal salts and complexing agents.

In some aspects, the emulsion polymerization process of the present disclosure can proceed through a semi-batch process to provide a rubber latex, such as polybutadiene latex. In various aspects, the semi-batch process can comprise introducing an initial liquid batch containing water, an emulsifier, and unsaturated monomers. This initial liquid batch can further optionally comprise an initiator, monomers, as well as chain transfer agents and additives. In other aspects, a liquid feed comprising monomer and a chain transfer agent as well as optional comonomomers and initiator dissolved in water can be introduced into the initial liquid batch. Finally, the vessel can be cooled during continuous feeding and then the monomers reacted during and after the continuous feeding. In an example, the rate of feeding can be such that the level of unreacted monomer is minimized and peak heat generation can occur early in the polymerization process.

In one example for the preparation of a polybutadiene latex, suitable unsaturated monomers of the initial batch contained in the reaction vessel can include 11% butadiene monomers, 86% water, 0.23% t-DDM, 1.2% TFA, 0.06% KOH, 0.23% TSPP, 0.03% SFS, 0.0006% $FeSO_4$, and 0.002% $Na_2EDTA$. The initial batch can be feed into the reaction vessel for a starting volume of from 50% to 60% at a temperature of from 50° C. to 70° C., such as 62.8° C.

(145° F.) and pressure of 790 to 824 kPa (100 to 105 PSIG). A continuous feed to the reaction vessel can comprise remaining diene monomer, chain transfer agents, and remaining reagents to the reaction vessel over a period of time at a controlled rate to a final temperature of 70° C. to 80° C., such as 71.1° C. (160° F.) and pressure between 341-410 kPa (35-45 PSIG) for a monomer conversion of more than 90 mol %, such as 94 mol %, based on the total moles of diene monomer used after 8 hours to 9 hours. A polybutadiene latex having an average particle size of between 60 nanometers (nm) and 120 nm can be provided.

In certain aspects, the formed latex can serve as a rubber substrate for the graft polymerization of the second stage of the emulsion polymerization process. The latex can be agglomerated or homogenized. The agglomeration process can increase the average particle size of the suspended latex particles upon which the monomers can be grafted. This substrate can be homogenized, or direct growth or chemically or colloidally agglomerated. In other aspects, the rubber latex substrate can remain unhomogenized prior to the graft polymerization process. When the graft reaction can be carried out in semi-batch, batch, or continuous fashion, in some aspects, it can be desirable to utilize a homonogenized substrate. Typically, the average particle size of the substrate can be 150 nm to 500 nm. If direct growth substrate is employed, the particle size distribution can be 60 nm to 500 nm.

In several aspects, a second stage of the emulsion polymerization process can provide a grafted rubber latex, such as acrylonitrile butadiene styrene (ABS) latex. In further aspects, monovinylidiene aromatic hydrocarbon monomers (for example, styrene) and ethylenically unsaturated nitrile monomers can be polymerized into a rubber substrate prepared according to the first stage as described herein. In an example, a graft (emulsion) polymerization to provide a grafted rubber latex (e.g., an ABS latex), can include charging the reaction system with a substrate such as a diene rubber latex (polybutadiene latex), adding a first portion of at least one of a styrene and one of an acrylonitrile to the polybutadiene latex, adding to the reaction system over a predetermined time a catalyst (the free radical initiator) and a second portion of at least one of acrylonitrile and styrene monomers, and polymerizing the catalyzed reaction mixture of polybutadiene latex, styrene and acrylonitrile. The graft polymerization process can also include an emulsifier, and chain transfer agent. In one example, a portion of substrate, monomers, initiator(s), emulsifiers and chain transfer agent can be added at various times including before or at the beginning of the addition of monomer, during the addition of monomer, at or after the completion of the addition monomer.

In an example, an initial feedstream comprising water, surfactant (or emulsifier), and the rubber latex substrate can be introduced into a reactor system and a pre-soak operation can be carried out. The pre-soak can include the addition of at least one of a monomer or a combination of monomers. More specifically, for the production of an ABS latex, the feedstream can comprise water, surfactant (emulsifier), and polybutadiene latex into which a pre-soak of at least one of styrene, acrylonitrile, or a mixture thereof is added. In other aspects, no pre-soak is added. In various further examples, there is no addition of the first portion of styrene and/or acrylonitrile before the addition of the initiator.

The temperature of the contents of the reaction vessel can be increased, for example, to approximately 65.5° C. (150° F.) and maintained at that temperature during continuous feed into the vessel. Once the feeds are completed, the reactor can be continuously stirred to mix using a stirrer or agitator until a high conversion (95.0% to 99.9%) is obtained. The increased or elevated temperature can be maintained for between approximately 30 minutes and 3 hours, for example 1 hour. By maintain the temperature for said period of time (e.g., approximately 1 hour), the polymerization process can be completed. The contents of the vessel can then be cooled. In some aspects, a third monomer in addition to those of the pre-soak can be added after monomer conversion has surpassed 98%. The addition of the third monomer can minimize the amount of residual monomers or unreacted styrene and acrylonitrile. The conversion rate can be based upon the total conversion rate of the monovinylidiene aromatic hydrocarbon monomers and the ethylenically unsaturated nitrile monomers. The resultant ABS latex can have a low content of unreacted residual monomers. This third monomer can be added to the emulsion grafting reaction after the 98% monomer conversion point is selected on the basis of being highly reactive with the monomer formulation, including both the monovinylidiene aromatic hydrocarbon monomer (e.g., styrene) and the ethylenically unsaturated nitrile monomer (e.g., acrylonitrile). In some aspects, the third monomer can be a monomer having a low boiling point, that is, a boiling point below 121.1° C. (250° F.). The low boiling point of the third (additional) monomer can allow for the monomer to be readily volatized during the recovery of a resin (such as an ABS resin) from a latex (ABS latex) by coagulation, washing, and drying.

In various aspects, an additional (third) monomer can include at least one of methyl acrylate, ethyl acrylate, butyl acrylate, 2-ethylhexyl acrylate, cyclohexyl acrylate, benzyl acrylate, isopropyl acrylate, methyl methacrylate, ethyl methacrylate, butyl methacrylate, isopropyl methacrylate, isodecyl methacrylate, cyclohexyl methacrylate, benzyl methacrylate, acrylamide, methacrylamide, vinylidine chloride, vinylidine bromide, vinyl esters, such as, vinyl acetate, and vinyl propionate, dialkyl maleates or fumarates such as dimethyl maleate, diethyl maleate, dibutyl maleate, dimethyl fumarate, diethyl fumarate, and dibutyl fumarate. In one embodiment, the third monomer is selected from methyl acrylate and methyl methacrylate.

As used herein, substrate can refer to the rubber latex onto which the styrene and acrylonitrile are grafted. In one aspect, substrate can refer to a poly butyl acrylate latex. In various further examples, the substrate can be a polybutadiene latex (particularly for the preparation of an ABS latex) with an emulsifier dispersed throughout the aqueous medium of the latex. In an example, the emulsifier can be a fatty acid soap or a high molecular weight alkyl or alkaryl sulfate or sulfonate. In various further aspects, the substrate can be a polybutadiene, styrene-butadiene rubber (SBR), acrylonitrile-butadiene rubber (NGR), homopolymers of chloroprene, homopolymers of isoprene, copolymers of butadiene with isoprense, or chloroprene, 2-methyl-1,3-butadiene, 2,3-dimethyl-1,3-butadiene, 1,2-propadiene, 1,4-pentadiene, 1,5-hexadiene, 1,2-pentadiene and ABS. This substrate can be homogenized, unhomogenized direct growth or chemically or colloidally agglomerated. In an example, the rubber substrate can be polybutadiene latex for the preparation of acrylonitrile butadiene styrene.

In various aspects, a free radical initiator can be used to propel the graft polymerization process. The initiators can include peroxides and/or azo compounds which are active in grafting and decompose into radicals. In addition to redox initiators, peroxy initiators which have the capability to provide free radicals to the reaction may also be used.

Examples of appropriate initiators can include cumene hydroperoxide (CHP), sodium persulfate, potassium persulfate, ammonium persulfate, di-isopropylbenzene hydroperoxide, tertbutyl-peroxide, and 2-2'azo-bis-isobutyrylnitrile (AIBN), in combination with other compounds such as reducing agents, heavy metal salts and complexing agents. A single initiator system or multiple initiator additions over intervals of time can be employed. The initiator(s) can be added at various times including at the beginning of the addition of a third monomer, during the addition of a third monomer, at or after the completion of the addition of a third monomer.

In one aspect, initiator can be added to the reaction system in an amount to provide sufficient initiator for the duration of the polymerization reaction. In another embodiment, the initiator or catalyst is included within the range of 0.01 percent by weight to 2 percent by weight of the polymerizable monomer. In a second embodiment, initiator is added in an amount of 0.1 wt. % to 0.5 wt. % of the polymerizable monomer. In yet another embodiment, initiator can be added during the addition of monomers to ensure favoring of the grafting reaction.

In certain aspects, a post-shot addition of the initiator and/or a third monomer can be delayed until the conversion of styrene and acrylonitrile monomers is greater than 98% in one embodiment, or greater than 99% in another embodiment, or greater than 99.5% in a further embodiment, based on the original acrylonitrile monomer introduced to the reaction polymerization system.

Emulsifying agents which can be used in the graft polymerization process can include a fatty acid soap, an alkaline metal or ammonium soap of a high molecular weight alkyl or alkaryl sulfate or sulfonate, etc., in total amounts of 0.1 parts by weight to 8 parts by weight per 100 parts by weight of the monomer formulation.

In various aspects, the graft emulsion polymerization process can be carried out in a batch, semi-batch, or continuous operation. If in a semi-batch operation, then an initial charge of substrate including water, surfactant and polybutadiene can be made to a reaction system and at or after the completion of the initial charge, a pre-soak operation can be carried out which can include the addition of at least one of styrene, acrylonitrile, or a mixture of styrene and acrylonitrile.

In some aspects, the temperature of the reaction system can vary from 37.8° C. (100° F.) to 93.3° C. (200° F.), or from 48.8° C. (120° F.) to 82.2° C. (180° F.), or from 54.4° C. (130° F.) to 71.1° C. (160° F.). In certain aspects, sufficient heat removal from the exothermic polymerization reaction system can be achieved by the use of heat exchangers so that the reaction system is maintained at a satisfactory temperature. The contents of the reaction vessel can be stirred to produce good dispersion of the reactor contents and the desired amount of heat transfer.

In one aspect, wherein a third monomer can be added late in the reaction, the ratio of total styrene monomer added to acrylonitrile monomer added can be 1.5 to 1 to 4 to 1, and in another aspect, from 2 to 1 to from 3.5 to 1. In various aspects, the ratio of total diene rubber (e.g., polybutadiene latex) added to the total of styrene monomer and acrylonitrile monomer is 0.1 to 1 to 3.0 to 1, and in another exemplary embodiment, 0.2 to 1 to 2 to 1. In some aspects, at least one of acrylonitrile and styrene monomers can be added to the reaction system over a time of from 30 minutes to 200 minutes, or from 45 minutes to 160 minutes. In various aspects, the ratio of the first portion of styrene monomer to the second portion of styrene monomer can be 1 to 3 to 1 to 5 and the ratio of a first portion of acrylonitrile monomer to the second portion of acrylonitrile monomer is 1 to 3 to 1 to 5. In further aspects, a first portion of at least one of styrene monomer and acrylonitrile monomer or a mixture thereof is added to the polybutadiene emulsion. In another aspect, there can be one addition of styrene monomer and one addition of acrylonitrile monomer.

In one aspect, after permitting the reaction to proceed for 40 to 90 minutes after the addition of the initiator, the acrylonitrile monomer, and the styrene monomer is completed, 0.5 to 5.0 parts of a third monomer per 100 parts of total polymer and monomer, and/or additional initiator can be added to the reaction mixture.

In one aspect, the methods disclosed herein provide for the preparation via emulsion polymerization of a polybutadiene latex rubber substrate, or a poly butyl acrylate rubber substrate, or other rubber substrate suitable for grafting through further emulsion polymerization with appropriate monomers and other reagents. The methods disclosed, however, are applicable to a number of other emulsion polymerization processes, or other polymerization processes which generates a latex phase or polymer suspension, such as suspension polymerization.

The present disclosure further includes the use or performance of a coagulation process subsequent the polymerization process for manufacturing or producing resin product (i.e., the final or resultant product) such as powder, for example. The resin can exist in a solid, or at least substantially solid, state. In several embodiments, the resin have an increased compatibility with other plastics (e.g., powders), thereby enhancing or increasing the ease and/or efficiency associated with mixing of the solid resin powders with other plastic powders, for instance during a compounding process for manufacture of plastic or plastic-based products.

In addition, the present disclosure details novel configurations of temperatures, reagent combinations, relative reagent concentrations and/or quantities, and/or durations during portion(s) of the polymerization process for manufacturing or producing ABS latex or polybutadiene latex (or, a general latex intermediary product). The use of such novel configuration of temperatures, reagent combinations, relative reagent concentrations and/or quantities, and/or durations during portion(s) of the polymerization process can facilitate or enable production of ABS resin (final product).

Latex Treatment

Before proceeding with further processing for subsequent preparation of copolymer resins, or isolation to obtain resin, an aqueous latex can often be contained in a storage system. The storage system can comprise a storage vessel through which an effluent can flow. In various aspects, the storage vessel can contain the latex intermediary as well as a base, such as potassium hydroxide (KOH) to maintain the pH value. The holding period can last from a few hours to several days or weeks. As noted herein, during this time, the aqueous environment of the latex at a temperature of from 32.2° C. (90° F.) to 48.9° C. (120° F.) can be susceptible to the accumulation of microbes. This biological growth can yield pigmented biomass that discolors the latex and can result in staining of an ultimate resin product.

In an aspect, the present disclosure provides methods for reducing biological growth during storage of a latex intermediary of emulsion polymerization for copolymer resins. The efficacy of the methods disclosed herein can be assessed by measuring the amount of biological growth in a sample of emulsion polymerized latex stored at a given temperature over a period of time. The measurement of microbial growth can be determined according to ASTM D5465, "Standard Practice for Determining Microbial Colony Counts from Waters Analyzed by Plating Methods." In various aspects, the presence of microbes can alter the color of the stored latex and remain with the latex through subsequent processing. The extent of the visible effect of the microbes on the latex coloring can be assessed according to ASTM E313, Yellowness Index (YI). YI is derived from spectrophotometric data to describe the shift in color among a series of test specimens. According to this color matching analysis, a dried resin sample (obtained from the subsequent isolation and processing of a latex) was molded into a disk form for measurement via spectrophotometer to provide values for the Yellowness Index. Samples of the latex can also be measured using a spectrophotometer to obtain corresponding colorimetric coordinates L*, a*, and b* for comparison among the samples. The higher L*, and the lower a*, b* and YI can represent whiter and better color for the final resin product.

In one aspect, methods for inhibiting biological growth in the stored latex of the present disclosure can comprise reducing the duration of the storage time for the latex. In an example, reducing the storage time by 25% can result in a decrease of the bacteria count from $10^3$ CFU/ml to $10^2$ CFU/ml as measured in the latex sample at a temperature of 40.6° C. (105° F.).

In some aspects, methods can comprise the use of a chlorinated solution effluent to the latex storage system and a cleansing of the latex storage system with detergent. In various aspects, the disinfectant solution can comprise a chlorinated water solution having an amount of from 0.05 ppm to 3 ppm free chlorine. The combination of chlorinated effluent and detergent cleansing can inhibit biological growth in the system at a temperature of less than 40.6° C. (105° F.). Surfaces of the latex storage system, including the interior of the reactor vessel, the storage tank, and internal piping can be cleansed with mild detergent. As an example, the combined chlorinated effluent and detergent cleansing of the latex storage system can result in a decrease of the bacteria count from $10^3$ CFU/ml to less than $10^2$ CFU/ml (with no visible microbial growth).

In yet further aspects, methods can comprise introducing an antimicrobial agent to the latex sample or exposing the latex sample to ultraviolet light. In an example, sodium bromide and trichloro-S-triazinetrione (commercially available as Towerbrom 991) can be introduced into the latex sample taken from the storage vessel in an amount of 0.1 ppm to 10 ppm. The use of an antimicrobial agent can reduce biological growth on a sample latex compared to a similar sample in the absence of an antimicrobial agent and stored at 46.1° C. (115° F.). Moreover, visible bacterial growth on the surface of the latex sample can be ostensibly eliminated. That is, the visible accumulation of microbes on the latex sample can be reduced. Other antimicrobial agents, including but not limited to agents containing chlorine, peroxides, or aldehydes, can be used.

The latex sample can be taken from stored latex tank and treated with ultraviolet (UV) light. UV light can also significantly reduce the measured levels of biological growth. In an example, exposing the latex sample (stored at 46.1° C. (115° F.)) to ultraviolet light for a duration of 10 minutes at room temperature can reduce biological growth on a sample latex from $10^3$ CFU/ml to less than $10^2$ CFU/ml compared to a similar sample in the absence of ultraviolet exposure and stored at 46.1° C. (115° F.). In various aspects, the duration of exposing the latex to UV light can be from 5 minutes to 12 hours. As with the antimicrobial agent, visibly apparent biological growth on the surface of the latex sample can be eliminated using ultraviolet light.

Coagulation Process

The treated latex produced from a polymerization, for example, as described herein, can then undergo a coagulation process wherein the latex is exposed to a mixture of water and a coagulant. During the coagulation process, fine particulates agglomerate or clump together and accumulate at the top or settle at the bottom of the dispersion, and can be separated or harvested via a filtration or centrifuge process.

In further instances, it is desirable to isolate the latex by coagulation in acid or salt. In such instances the emulsion polymer can be contaminated by residual acid, or species derived from the action of such acid, for example carboxylic acids derived from fatty acid soaps used to form the emulsion. The acid used for coagulation can be a mineral acid; such as sulfuric acid, hydrochloric acid, nitric acid, phosphoric acid or mixtures thereof. In some cases the acid used for coagulation has a pH less than 5. Common coagulants can include acids such as sulfuric acid and can include salts having monovalent or multivalent ions. Exemplary coagulant reagents can thus include sodium chloride, sodium sulfate, calcium chloride, or ammonium acetate or other salts comprising a monovalent cation and a monovalent anion.

In many embodiments, the coagulation process can occur or is performed in a vessel, for example a 208 liter (55-gallon) vessel. The volume or capacity of the vessel for the coagulation process can be increased, for example for preparing or manufacturing ABS latex on an industrial scale. The vessel can be filled with water, for instance with 49 liters (13 gallons) of water. The latex for coagulation, coagulant, and other reagents (such as an initiator) can be added to the vessel and stirred. The temperature of the content of the vessel can be from 54.4° C. (130° F.) to 87.8° C. (190° F.) or greater. The mixture can be stirred resulting in an output slurry. The output slurry can be centrifuged to remove the water. The output wet resin can be dried in a fluidized-bed dryer for approximately 0.5 to 2 hours at a temperature of 48.8° C. (120° F.) to 71.1° C. (160° F.) or greater until the resin has a final moisture content of less than 2%.

The coagulation process can produce a resultant product, for example, an ABS resin, or an ASA resin. The resin can be produced as a suspended substance, product, or powder in water. More specifically, an obtained resin can include solid particles. As an illustrative example and not to be limiting, an ABS provided by various embodiments of the present disclosure can be used to manufacture plastics or plastic products, including those products that have a smooth or substantially smooth surface. Additionally, an isolated ABS resin can be used or combined with other plastic-based resins or additives to produce ABS plastic or ABS alloy with different thermal, mechanical, and electrical properties.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

As used herein, "aging time" refers to the duration the latex phase resulting from an emulsion polymerization process is maintained in an aqueous environment prior to further processing.

As used herein, "coagulation" or "coagulating" or any of its derivatives refers to a process of deriving polymer from a latex wherein a coagulant is introduced to the latex to cause a polymer to coagulate from the aqueous phase. Latex coagulation can occur through the introduction of acid or salt to the aqueous latex environment. The coagulated polymer can be isolated from the aqueous phase and dried.

Unless otherwise stated to the contrary herein, all test standards are the most recent standard in effect at the time of filing this application.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

It is to be understood that the present compounds, compositions, articles, systems, devices, and/or methods disclosed and described are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

The present invention relates to a method comprising
combining, in a reactor or a reactor vessel, monomers, an emulsifier or surfactant, and an initiator in solution at a temperature of from 48.9° C. (120° F.) to 82.2° C. (180° F.) to form a polymeric latex;
directing the polymeric latex into a storage system comprising a storage vessel;
subjecting the polymeric latex to an aging time in the storage vessel, such that the polymeric latex exhibits less than 1000 CFU/ml of biological growth according to ASTM D 5465-93 (2012) upon completion of the aging time, optionally comprising a treatment for reducing biological growth; and
coagulating the polymeric latex, wherein the polymeric latex is exposed to a mixture of water and a coagulant and filtered to provide a resin.

Such method results in a resin having a reduced discoloration as reflected by the yellowness index (YI) determined according to ASTM E313.

The aging time in the storage vessel may for example be ≤20 hrs, preferably ≤18 hrs. For example, the storage time may be ≥10 hrs and ≤20 hrs, alternatively ≥15 hrs and ≤18 hrs. The resin obtained upon such aging time shows a good balance of color properties. It is preferred that the temperature in the storage vessel is ≤60° C., preferably ≥20° C. and ≤60° C., even more preferably ≥25° C. and ≤50° C.

It is further preferred that in the reactor or reactor vessel, the monomers, emulsifier, and initiator are combined with a chain transfer agent and/or a crosslinking agent.

The emulsifier may for example be an anionic surfactant. The initiator may for example be a radical polymerization initiator comprising a peroxide or an azo compound. The chain transfer agent may comprise an alkyl mercaptan compound. The crosslinking agent may comprise a compound having multiple carbon-carbon double bonds, preferably triallyl cyanurate.

The polymeric latex may further be grafted with unsaturated monomer to yield a polymeric material comprising a rigid phase and a grafted latex phase. The monomers may for example comprise a mixture of styrene acrylonitrile, butadiene, butyl acrylate, methyl methacrylate, or a combination thereof.

The polymeric latex may for example comprise acrylonitrile-butadiene-styrene, acrylonitrile styrene acrylate, styrene acrylonitrile, styrene encapsulated polytetrafluoroethylene, methyl methacrylate modified acrylonitrile butadiene styrene, or other grafted copolymer resin. The polymeric latex may for example comprise from 25 wt. % to 65 wt. % solids, preferably from 30 wt % to 55 wt %, more preferably from 35 wt % to 50 wt %.

In a further embodiment, the present invention relates to a comprising:
combining, in a reactor or a reactor vessel, monomers, an emulsifier or surfactant, and an initiator in solution at a temperature of from 48.9° C. (120° F.) to 82.2° C. (180° F.) to form a polymeric latex;
directing the polymeric latex into a storage system comprising a storage vessel;
subjecting the polymeric latex to a treatment for reducing microbial growth during aging time in the storage vessel, wherein the polymeric latex exhibits less than 1000 CFU/ml of biological growth according to ASTM D 5465-93 (2012); and coagulating the polymeric latex, wherein the polymeric latex is exposed to a mixture of water and a coagulant and filtered to provide a resin.

The treatment for reducing biological growth may for example comprise:

flushing the storage system with a chlorine solution, wherein the chlorine solution preferably contains from 0.05 ppm to 3 ppm chlorine;

exposing the polymer latex with ultraviolet light; and/or adding an antimicrobial agent to the latex.

Further, the treatment for reducing biological growth further may comprise cleansing the storage vessel with detergent.

The polymerization according to the present invention may for example proceed through a batch, semi-batch, or continuous process.

Particularly, the present invention in one of its embodiments relates to a method comprising combining, in a reactor or a reactor vessel, monomers, an emulsifier or surfactant, and an initiator in solution at a temperature of from 48.9° C. (120° F.) to 82.2° C. (180° F.) to form a polymeric latex;

directing the polymeric latex into a storage system comprising a storage vessel;

subjecting the polymeric latex to an aging time in the storage vessel, such that the polymeric latex exhibits less than 1000 CFU/ml of biological growth according to ASTM D 5465-93 (2012) upon completion of the aging time, optionally comprising a treatment for reducing biological growth; and coagulating the polymeric latex, wherein the polymeric latex is exposed to a mixture of water and a coagulant and filtered to provide a resin;

wherein the monomers comprise a mixture of styrene acrylonitrile, butadiene, butyl acrylate, methyl methacrylate, or a combination of at least two thereof;

the emulsifier comprises an anionic surfactant;

the initiator comprises one or more compounds selected from cumene hydroperoxide (CHP), sodium persulfate, potassium persulfate, ammonium persulfate, di-isopropylbenzene hydroperoxide, tertbutyl-peroxide, 2-2'azo-bis-isobutyrylnitrile (AIBN), or a combination of at least two thereof;

the polymeric latex comprises from 25 wt. % to 65 wt. % of solids;

the aging time in the storage vessel is ≥10 hrs and ≤20 hrs; and the resin that is obtained is one selected from acrylonitrile-butadiene-styrene, acrylonitrile styrene acrylate, styrene acrylonitrile, styrene encapsulated polytetrafluoroethylene, or methyl methacrylate modified acrylonitrile butadiene styrene.

Aspects

In various aspects, the present invention pertains to and includes at least the following aspects.

Aspect 1. A method comprising: combining, in a reactor or a reactor vessel, monomers, an emulsifier or surfactant, and an initiator in solution at a temperature of from 48.9° C. (120° F.) to 82.2° C. (180° F.) to form a polymeric latex; directing the polymeric latex into a storage system comprising a storage vessel; subjecting the polymeric latex to a treatment for reducing microbial growth during aging time in the storage vessel, wherein the polymeric latex exhibits less than 1000 CFU/ml of biological growth according to ASTM 5465; and coagulating the polymeric latex, wherein the polymeric latex is exposed to a mixture of water and a coagulant and filtered to provide a resin.

Aspect 2. The method of aspect 1, further comprising combining a chain transfer agent or crosslinking agent with combining the monomers, emulsifier, and initiator.

Aspect 3. The method of any of aspects 1-2, further comprises grafting the polymeric latex with unsaturated monomer to yield a polymeric material comprising a rigid phase and a grafted latex phase.

Aspect 4. The method of any of aspects 1-3, wherein the polymeric latex comprises acrylonitrile-butadiene-styrene, acrylonitrile styrene acrylate, styrene acrylonitrile, styrene encapsulated polytetrafluoroethylene, methyl methacrylate modified acrylonitrile butadiene styrene, or other grafted copolymer resin.

Aspect 5. The method of any of aspects 1-4, wherein the polymeric latex comprises from 25 wt. % to 65 wt. % solids.

Aspect 6. The method of any of aspects 2-5, wherein the chain transfer agent comprises an alkyl mercaptan compound.

Aspect 7. The method of any of aspects 2-5, wherein the crosslinking agent comprises a compound having multiple carbon-carbon double bonds.

Aspect 8. The method of aspect 7, wherein the compound having multiple carbon-carbon double bonds is triallyl cyanurate.

Aspect 9. The method of any of aspects 1-8, wherein the monomers comprise a mixture of unsaturated monomers.

Aspect 10. The method of any of aspects 1-9, wherein the monomers comprise a mixture of styrene acrylonitrile, butadiene, butyl acrylate, methyl methacrylate, or a combination thereof.

Aspect 11. The method of any of aspects 1-10, wherein the emulsifier is an anionic surfactant.

Aspect 12. The method of any of aspects 1-11, wherein the radical polymerization initiator comprises a peroxide or an azo compound.

Aspect 13. The method of any of aspects 1-12, wherein the polymerization proceeds through a batch, semi-batch, or continuous process.

Aspect 14. The method of any of aspects 1-13, wherein the treatment for reducing biological growth comprises flushing the storage system with a chlorine solution.

Aspect 15. The method of aspect 14, wherein the chlorine solution contains from 0.05 ppm to 3 ppm chlorine.

Aspect 16. The method of any of aspects 14-15, wherein the treatment for reducing biological growth further comprises cleansing the storage vessel with detergent.

Aspect 17. The method of any of aspects 1-13, wherein the treatment for reducing biological growth comprises exposing the polymer latex with ultraviolet light.

Aspect 18. The method of any of aspects 16-17, wherein the polymeric latex can be maintained for from 2 hours to 60 hours without biological growth at a temperature of up to 71.1° C. (160° F.).

Aspect 19. The method of any of aspects 1-13, wherein the treatment for reducing biological growth comprises adding an antimicrobial agent to the latex.

Aspect 20. The method of any of aspects 1-19, wherein the resin is used in a compounding process to produce an acrylonitrile butadiene styrene or acrylonitrile styrene acrylate plastic or alloy product.

EXAMPLES

Detailed embodiments of the present disclosure are disclosed herein; it is to be understood that the disclosed embodiments are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

The following examples are provided to illustrate the compositions, processes, and properties of the present disclosure. The examples are merely illustrative and are not intended to limit the disclosure to the materials, conditions, or process parameters set forth therein.

The ABS latex was prepared via a seeded emulsion polymerization of polybutadiene latex and acrylonitrile and styrene monomers. An initial charge of a polybutadiene latex was added to a three liter reaction vessel and heated to 57.2° C. (135° F.). Then a feedstream of 0.375 parts of cumene hydroperoxide (CHP) initiator, a feedstream of 12 parts of acrylonitrile, and a feedstream of 36 parts of styrene was started. The feedstream of acrylonitrile and styrene were added to the reaction vessel over a duration of 60 minutes and 65 minutes. A feed stream of 1 part of methyl methacrylate was added to the reaction vessel over a duration of 5 minutes after acrylonitrile and styrene feeding.

The resulting ABS latex comprising 40% solids was then transferred to the vessel for storage with through-flow effluent, a water flush after transfer. The latex could then be then pumped into an isolation system to obtain ABS resin Isolation of the resin can occur via the coagulation, filtering, washing, filtering, and drying process as described herein.

ABS latex held for 20 hours at 40.5° C. (105° F.) served as Comparative Example 1 (CE1). A further comparative example CE2 was prepared. CE2 contained ABS latex similar to CE1, except that the aging time (duration of storage) of the latex is increased to 48 hours from 20 hours. Five inventive samples, labeled Sample 2 to Sample 6 (S2-S6) were also obtained. Sample 2 contained ABS latex similar to CE1, except that the aging time (duration of storage) of the latex is decreased to 15 hours from 20 hours. For Sample 3, the aging time was reduced to 15 hours and a solution at 0.15 ppm chlorine was introduced as the effluent to flush the pipelines. Surfaces of the storage system parts were also cleaned with detergent. In S4, the temperature of the storage system was increased to 46.1° C. (115° F.) and the chlorinated effluent was used to flush the pipelines. In S5, 5 ppm of a commercial biocide comprising sodium bromide and trichloro-S-triazinetrione was used to treat the sample. Finally, S6 was illuminated with 750 W ultraviolet light for 10 minutes.

The yellowness of the samples was observed according to ASTM E313 Yellowness Index (YI) using a colorimeter on a molded resin disk. YI is obtained from spectrophotometric data to describe the change in color among a series of test specimens. The spectrophotometric analysis also provided values for colorimetric coordinates $L^*$, $a^*$, $b^*$. The coordinates correspond to different color attributes: $a^*$ represents redness and green; $b^*$, yellow and blue; and $L^*$, whiteness. A higher value for YI indicates more yellowness in a sample. A higher value for $L^*$ indicates that the sample is whiter, or lighter, in color. Samples having a higher $L^*$ and lower $a^*$, $b^*$, and YI would tend to indicate improved whiteness in the overall color.

Agar pigmentation results and bacterial counts were obtained for Comparative Examples 1-2 (CE1-CE2) as well as inventive samples S2-S6.

After treatment, latex samples were introduced into culture growth containers containing an agar medium at room temperature to observe visible pigmented growth. The visible extent of bacterial growth was assessed after seven days using an agar dish.

After treatment, the bacterial count was also performed on the latex samples to estimate the number of bacteria present in the sample. Latex samples were evaluated for biological growth using a microbial test kit (SANI Check B bacteria test kit, Biosan Lab) to obtain a bacterial count. Latex samples were collected in the pint cups from storage tank. A sampling paddle from each test vial was immersed into each sample for 2-3 seconds. The excess fluid was drained by touching the end of the paddle to a paper towel. Each sampling paddle was then placed into its testing vial. The vials were closed and incubated at the room temperature (27.8° C. (82° F.)) for 4 days. The bacteria level was determined in accordance with ASTM D5465-93 (2012). A measure of less than $10^2$ (or 100) CFU/ml shows minimal or no biological activity.

Table 1 shows the pigmented bacteria, bacterial counts, and color testing observed for each latex sample (CE1-CE2 and S2-S6).

TABLE 1

Biological growth accumulation on latex samples according to treatment conditions.

|  | CE1 | CE2 | S2 | S3 | S4 | S5 | S6 |
|---|---|---|---|---|---|---|---|
| ABS Latex Solids (%) | 40 | 40 | 40 | 40 | 40 | 40 | 40 |
| Conditions | | | | | | | |
| Storage Temperature (° C. (° F.)) | 40.6 (105) | 40.6 (105) | 40.6 (105) | 40.6 (105) | 46.1 (115) | 46.1 (115) | 46.1 (115) |
| Aging Time in Tank (hr) | 20 | 48 | 15 | 15 | 15 | 15 | 15 |
| Chlorinated Effluent | No | No | No | Yes | Yes | Yes | Yes |
| System Cleansed | No | No | No | Yes | No | No | No |
| Additive | No | No | No | No | No | Agent | UV |
| Test Results | | | | | | | |
| Bacteria Count (CFU/ml) | $10^3$ | $10^6$ | $10^2$ | $<10^2$ | $10^3$ | $<10^2$ | $<10^2$ |
| Visible microbes on latex | Yes | Yes | Yes | No | Yes | No | No |
| Color $L^*$ Value | 83.8 | 81.3 | 84.8 | 86.3 | 82.6 | — | — |
| Color $a^*$ Value | −1.2 | −0.4 | −1.8 | −2.5 | 0.2 | — | — |
| Color $b^*$ Value | 19.6 | 21.1 | 18.4 | 17.9 | 17.6 | — | — |
| Color YI Value | 30.3 | 33.1 | 28.4 | 27.4 | 27.8 | — | — |

From CE1 to S2, where the aging time is reduced, the bacteria count decreases from $10^3$ CFU/ml to $10^2$ CFU/ml. CE1 and S2 show some visible microbe accumulation. Between CE1 and S2, Yellowness Index values have also decreased from 30.3 to 28.4. Sample 1 also exhibited a higher L* value, and lower a*, b*, and YI values. CE2, having the longest aging time at 48 hours accordingly exhibited the highest bacteria count at $10^6$ CFU/ml. CE2 contained the significant biological growth on the cultured latex samples. CE2 also exhibited the highest yellowness index values among all samples indicating the difference in coloring of CE2 compared to the other specimens. In S3, where the chlorinated effluent was used and the storage system was cleansed, the bacteria count is again reduced to less than $10^2$ CFU/ml. There was no visible pigmented biogrowth apparent in the S3 agar samples and values for a*, b*, and YI had decreased compared to those of CE1. For S4, however, the effect of the chlorinated effluent appeared to be overcome by the increase in temperature from 40.6° C. (105° F.) to 46.1° C. (115° F.). S4 exhibited an elevated bacteria count of $10^3$ CFU/ml. Moreover, a* values increased compared to CE1. CE2, having the highest bacteria count also showed increased values for a*, b*, and YI. Finally, although at elevated temperatures, S5 and S6 showed the lowest bacteria counts at less than $10^2$ CFU/ml with no visible pigmented biogrowth.

The invention claimed is:

1. A method comprising
combining, in a reactor or a reactor vessel, monomers, an emulsifier or surfactant, and an initiator in solution at a temperature of from 48.9° C. (120° F.) to 82.2° C. (180° F.) to form a polymeric latex;
directing the polymeric latex into a storage system comprising a storage vessel;
subjecting the polymeric latex to an aging time in the storage vessel, such that the polymeric latex exhibits less than 1000 CFU/ml of biological growth according to ASTM D 5465-93 (2012) upon completion of the aging time, optionally comprising a treatment for reducing biological growth; and
coagulating the polymeric latex, wherein the polymeric latex is exposed to a mixture of water and a coagulant and filtered to provide a resin.

2. The method of claim 1, wherein the aging time in the storage vessel is ≤18 hrs.

3. The method of claim 1, wherein the temperature in the storage vessel is ≤60° C.

4. The method of claim 1, further comprising combining the monomers, emulsifier, and initiator with a chain transfer agent and/or a crosslinking agent.

5. The method of claim 1, further comprising grafting the polymeric latex with unsaturated monomer to yield a polymeric material comprising a rigid phase and a grafted latex phase.

6. The method of claim 1, wherein the monomers comprise a mixture of styrene acrylonitrile, butadiene, butyl acrylate, methyl methacrylate, or a combination thereof.

7. The method of claim 1 wherein the polymeric latex comprises acrylonitrile-butadiene-styrene, acrylonitrile styrene acrylate, styrene acrylonitrile, styrene encapsulated polytetrafluoroethylene, methyl methacrylate modified acrylonitrile butadiene styrene, or other grafted copolymer resin.

8. The method of claim 1, wherein the polymeric latex comprises from 25 wt. % to 65 wt. % solids.

9. A method according to claim 1, comprising:
combining, in a reactor or a reactor vessel, monomers, an emulsifier or surfactant, and an initiator in solution at a temperature of from 48.9° C. (120° F.) to 82.2° C. (180° F.) to form a polymeric latex;
directing the polymeric latex into a storage system comprising a storage vessel;
subjecting the polymeric latex to a treatment for reducing microbial growth during aging time in the storage vessel, wherein the polymeric latex exhibits less than 1000 CFU/ml of biological growth according to ASTM D 5465-93 (2012); and
coagulating the polymeric latex, wherein the polymeric latex is exposed to a mixture of water and a coagulant and filtered to provide a resin.

10. The method of claim 1 wherein the treatment for reducing biological growth comprises
exposing the polymer latex with ultraviolet light; and/or
adding an antimicrobial agent to the latex said microbial agent comprising bromine, chlorine, peroxide or aldehyde.

11. The method of claim 1, further comprising cleansing the storage vessel with detergent and/or flushing the storage system with a chlorine solution.

12. The method of claim 1, wherein
the emulsifier is an anionic surfactant; and/or
the initiator is a radical polymerization initiator comprising a peroxide or an azo compound.

13. The method of claim 4, wherein
the chain transfer agent comprises an alkyl mercaptan compound; and/or
the crosslinking agent comprises a compound having multiple carbon-carbon double bonds.

14. The method of claim 1, wherein the polymerization proceeds through a batch, semi-batch, or continuous process.

15. The method of claim 3, wherein the temperature in the storage vessel is ≥20° C. and ≤60° C.

16. The method of claim 11, wherein the chlorine solution contains from 0.05 ppm to 3 ppm chlorine.

17. The method of claim 1 wherein the resin is dried.

18. The method of claim 17 wherein the resin is characterized by a yellowness index according to ASTM E313 or less than 30.

* * * * *